March 5, 1946.  N. A. CHRISTENSEN  2,396,155
HYDRAULIC BRAKE
Filed Jan. 30, 1943
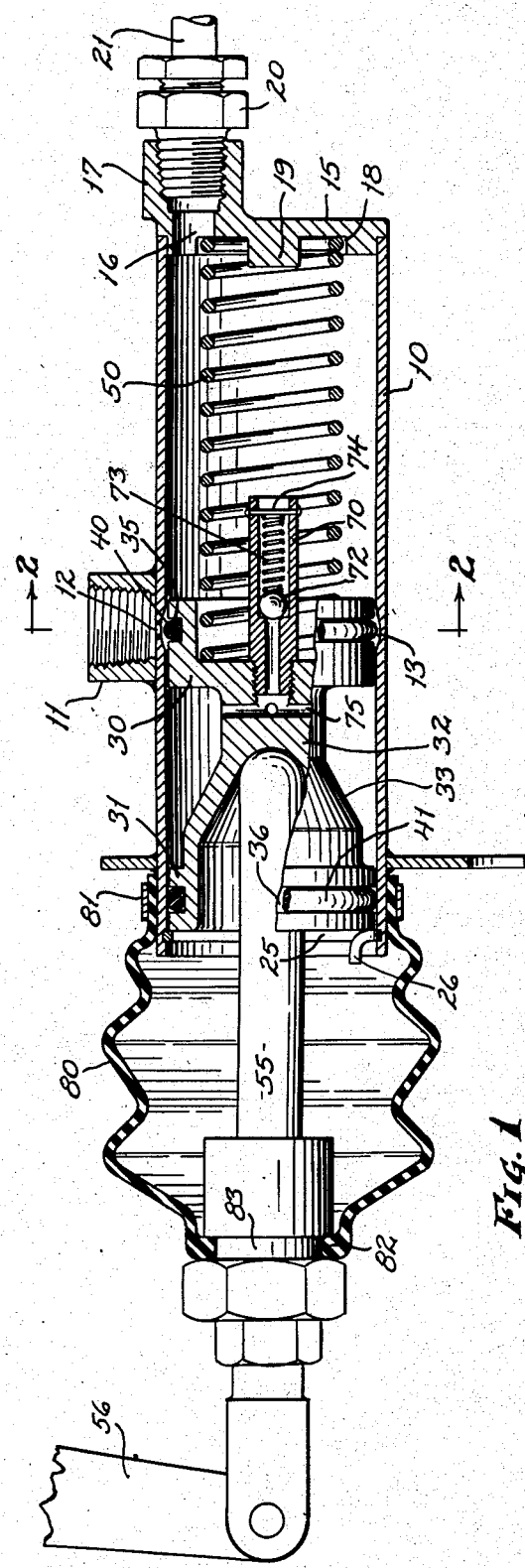
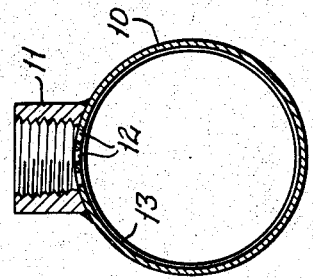
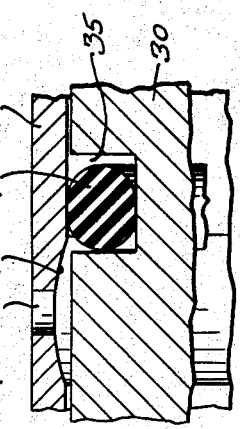
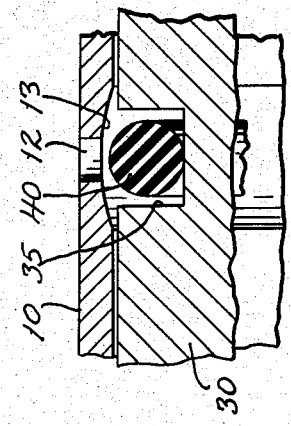
INVENTOR.
Niels A. Christensen,
BY
Bates, Teare & McBean
Attorneys.

Patented Mar. 5, 1946

2,396,155

UNITED STATES PATENT OFFICE 2,396,155

HYDRAULIC BRAKE

Niels A. Christensen, South Euclid, Ohio

Application January 30, 1943, Serial No. 474,115

1 Claim. (Cl. 60—54.6)

This invention relates to a master control device for a hydraulic brake system and constitutes an improvement on the master control device shown, described and claimed in my Patent No. 2,115,383, issued April 26, 1938. An important object of the present invention is to provide a master control which shall be light in weight and employ few but sturdy parts suitable for mass production. Another object is to so devise the construction that the use of castings is largely avoided, and the employment of non-ferrous metal obviated.

In carrying out the above objects and others contributing to the efficiency of the device, I provide a cylinder of seamless drawn steel tubing to which other readily constructed parts may be secured as by welding, and I provide a piston construction which is adapted for rapid machining by suitable tools and is formed to carry packing rings which coact with the cylinder wall to control the operation and prevent leakage.

My invention is hereinafter more fully described in connection with the drawing, and the essential novel features are summarized in the claim.

In the drawing Fig. 1 is a longitudinal section through one embodiment of my master device constituting this invention; Fig. 2 is a transverse section in plane indicated by the line 2—2 on Fig. 1; Fig. 3 is an enlarged fragmentary longitudinal section illustrating the relation of one of the packing rings to the cylinder wall in the brake-releasing position of the piston shown in Fig. 1; and Fig. 4 is a similar view showing the same parts in the brake applying position.

In the drawing, 10 indicates a seamless drawn steel cylinder, which constitutes the main frame of the device. On the exterior of this cylinder in the vicinity of its mid-region, is secured an internally threaded sleeve 11, shown as welded to the cylinder. This sleeve communicates with the interior of the cylinder by an arcuate row of ports 12 which communicate with an annular groove 13 in the inner wall of the cylinder. Fig. 1 shows at 14 a plate embracing the cylinder and welded to it and furnishing means for readily attaching it to the vehicle.

The discharge end of the cylinder is closed by a disc-like head 15 which seats within the bore of the cylinder and also overhangs the end thereof and is welded or otherwise secured in place. This head has an eccentrically placed discharge passageway 16 leading to an internally threaded sleeve 17. In the sleeve may be mounted a suitable nipple 20 forming the terminus of the discharge pipe 21 leading to the respective brakes. The other end of the cylinder is open except for an internal stopping spring ring 25 mounted in an internal groove in the cylinder and serving to limit the movement, in that direction, of the piston about to be described.

The piston is a member with two heads connected by a waist portion. Thus, there is an inner head 30 and an outer head 31, each of slightly less external diameter than the internal diameter of the cylinder, and a connecting portion between these heads comprising waist portion 32 of comparatively small diameter and a hollow conical portion 33 connecting the portion 32 with the head 31. The hollow space of the conical portion is designed to receive a push rod connected with the foot pedal mechanism to shove the piston, as hereinafter described.

The two piston heads are provided with peripheral grooves 35 and 36 adapted to receive packing rings 40 and 41 which are adapted to contact with the inner surface of the cylinder. The specific form of these rings will be hereinafter more fully described.

Between the piston head 30 and the cylinder head 15 is a helical compression spring 50 held laterally in place by seating in a recess 18 in the cylinder head and a recess 38 in the piston head 30. This spring tends to maintain the piston at its outermost position against the stop ring 25, which is the position where the brakes are released. In such position the packing ring 40 registers with the annular groove 13 on the inner surface of the cylinder, but does not reach the surface forming the base of the grooves (see Fig. 3), and there is thus in this position an open passageway for oil from the supply reservoir through the ports 12 into the space in front of the piston head 30 and the space behind it.

To operate the piston I provide a plunger 55, the outer end of which may be connected with a depending portion 56 of the brake pedal and the inner portion of which extends freely through the hollow portion of the piston head 31 and the conical portion 33 and rests against a seat on the waist portion 32 of the piston. This seat is spherically curved and the inner end of the plunger is correspondingly curved so that the piston may be readily engaged and shoved by the plunger 55 though the latter may be out of strict axial alignment with the cylinder.

When the piston has been shoved toward the discharge end of the cylinder the packing 40 passes beyond the groove 13 and engages snugly with the cylinder wall in advance thereof and thus shoves the oil or other liquid in the cylinder out through the passageway 16 to apply the brakes. On release of the foot pressure which operates the plunger the spring 50 returns the piston to the normal position of rest shown in Fig. 1.

To enable liquid in the braking system to be replenished whenever desired, by a pumping action of the brake pedal, I provide a passageway through the piston head 30 allowing the passage of liquid from the outer side of such head to the front thereof under the control of a check valve opening on the rearward stroke of the piston. As shown, the check valve comprises a tube casing 70 screwing into an axial opening in the piston and carrying a ball valve 72 normally pressed to its seat by an internal compression spring 73, the outer end of which is restrained by a pin 74. The axial passageway in the piston head occupied by the check valve sleeve communicates by lateral passageway 75 with the space about the reduced waist of the piston, which space is always in communication with the oil supply reservoir through the admission ports 12.

It results from the above described construction that if there is a gradual leakage of oil in the brake system the same is automatically replaced from the reservoir by oil passing through the piston and past the check valve. This takes place because such leakage would cause a reduction in the normal pressure in front of the piston and, hence, the oil behind the piston, which is always in communication with the reservoir, unseats the ball valve against the light spring pressure seating it and passes to the front of the piston until the pressure on both sides thereof is equalized. This replenishing action may be expedited by a rapid backward and forward movement of the piston commonly referred to as pumping.

I also utilize the check valve sleeve 70 as a stop to limit the forward movement of the piston. The cylinder head 15 being provided with an inward boss 19 forming a suitable abutment for such sleeve.

In Fig. 1, 80 indicates an elastic boot of impervious material, corrugated or accordion pleated, attached at one end to the cylinder by means of a clamping sleeve 81, and at the other end attached to the brake applying plunger. As shown the boot has an inwardly projecting flange 82 occupying a groove 83 in a fitting on the plunger 55. This boot collapses and expands as the plunger is operated, and allows the plunger to vary from its axial position as may be required by the mounting or the swinging action of the brake lever 56. Its effect is to prevent any extraneous matter reaching the piston or the interior of the cylinder.

I have referred to the packings 40 and 41 employed. These are annular elastic members of rubber-like material, the normal cross section of which is round, as shown in Fig. 3, and each of which occupies a groove, the longitudinal dimension of which is greater than the diameter of the cross section of the ring. This is clearly indicated in Fig. 3 which shows the condition of the packing 40 when out of engagement with the cylinder wall, and condition of the packing 41 before the piston is inserted in the cylinder, would have a similar appearance.

When the packing 41 is inserted in the cylinder, and when the movement of the piston carries the packing 40 beyond the groove 13, the packing ring is compressed to become elliptical in cross section and thus effectively react against the cylinder wall as indicated in Fig. 4. By reason of the clearance about the packing, such packing is given a rolling action until it engages one or the other longitudinal wall of the groove it occupies, as indicated in Fig. 4 on the advance movement. This rolling action has a kneading effect on the material of the ring, increasing its life.

It will be seen that my control device is simple in construction and that there is nothing about it to get out of order. The oil within the cylinder maintains each of the packing rings lubricated so that they have little wear. However, whenever it is necessary to remove the piston to replace the packing rings, this is readily effected by disconnecting the plunger operating mechanism and the boot 80 and springing out the split ring 25 which has an extension 26 for this purpose. This enables the entire piston to be withdrawn through the open end of the cylinder. The packing rings are sufficiently elastic so that worn rings can be then readily removed and fresh ones put in place in their respective grooves.

I claim:

In a master cylinder for a hydraulic brake wherein the cylinder has an intermediately located admission port, a circumferential groove of curved cross-section in the interior wall thereof in communication with the admission port, the plane of the center line of the groove being substantially coincident with the center of the admission port and a discharge port extending from one end thereof, a piston arranged to reciprocate within the cylinder, said piston having an annular groove and a packing ring mounted in said groove, said ring having a circular cross-section and being deformable, and having a cross-sectional diameter in undeformed shape greater than the depth of the piston ring groove, said ring being adapted to be deformed and to effect a seal with the cylinder when the piston is so moved that the groove therein is out of registration with the cylinder groove, and the piston ring groove being longer than the longest cross-sectional dimension of the packing ring when in said deformed condition, and the cross-sectional diameter of said ring being less than the depth between the bottom of the piston ring groove and the outermost surface of the cylinder groove, whereby clearance is provided between the ring and the cylinder when said grooves are in registration, and whereby at such times fluid may flow between the admission port and the cylinder on both sides of the said packing ring.

NIELS A. CHRISTENSEN.